US009229920B1

(12) United States Patent
Fiedler et al.

(10) Patent No.: US 9,229,920 B1
(45) Date of Patent: Jan. 5, 2016

(54) COMPOUND UNDO/REDO MANAGER FOR MIXED MODEL EDITS

(75) Inventors: Nathan Lyle Fiedler, San Lorenzo, CA (US); Christopher Bryan Webster, Dublin, CA (US); Nam Tuan Nguyen, Pleasant Hill, CA (US)

(73) Assignee: Oracle America Inc., Redwood Shores, CA (US)

( * ) Notice: Subject to any disclaimer, the term of this patent is extended or adjusted under 35 U.S.C. 154(b) by 1475 days.

(21) Appl. No.: 11/796,867

(22) Filed: Apr. 30, 2007

(51) Int. Cl.
*G06F 17/00* (2006.01)
*G06F 17/24* (2006.01)
*G06F 17/22* (2006.01)

(52) U.S. Cl.
CPC ............ *G06F 17/24* (2013.01); *G06F 17/2247* (2013.01)

(58) Field of Classification Search
CPC ... G06F 17/24; G06F 17/2247; G06F 17/211; H04L 67/02
USPC ......... 715/202, 205–206, 209–210, 234, 255, 715/700, 751, 760, 763–764; 709/203–204; 707/684, 999.001, 999.008, 999.01, 707/999.1, 999.101, 999.102, 999.2
See application file for complete search history.

(56) References Cited

U.S. PATENT DOCUMENTS

| | | | | |
|---|---|---|---|---|
| 4,815,029 A * | 3/1989 | Barker et al. | ................. | 715/205 |
| 5,479,601 A * | 12/1995 | Matheny et al. | ............... | 715/700 |
| 5,760,788 A * | 6/1998 | Chainini et al. | .............. | 345/474 |
| 5,801,687 A * | 9/1998 | Peterson et al. | .............. | 715/201 |
| 5,890,181 A * | 3/1999 | Selesky et al. | ................. | 715/255 |
| 5,990,906 A * | 11/1999 | Hudson et al. | ................. | 345/666 |
| 6,111,575 A * | 8/2000 | Martinez et al. | .............. | 715/810 |
| 6,146,027 A * | 11/2000 | Orton et al. | ................... | 715/835 |
| 6,185,591 B1 * | 2/2001 | Baker et al. | .................... | 715/210 |
| 6,237,135 B1 * | 5/2001 | Timbol | ......................... | 717/107 |
| 6,313,834 B1 * | 11/2001 | Lau et al. | ...................... | 715/803 |
| 6,377,964 B1 * | 4/2002 | Sano | ............................. | 715/205 |
| 6,449,762 B1 * | 9/2002 | McElvain | ..................... | 716/102 |
| 6,993,710 B1 * | 1/2006 | Coad et al. | ..................... | 715/202 |
| 7,114,149 B2 * | 9/2006 | Aptus et al. | .................... | 717/123 |
| 7,143,344 B2 * | 11/2006 | Parker et al. | ................... | 715/236 |
| 7,207,034 B2 * | 4/2007 | Burke et al. | ................... | 717/110 |
| 7,237,193 B1 * | 6/2007 | Zaky et al. | ..................... | 715/207 |
| 7,316,003 B1 * | 1/2008 | Dulepet et al. | ................ | 717/111 |
| 7,370,315 B1 * | 5/2008 | Lovell et al. | ................... | 717/100 |
| 7,584,420 B2 * | 9/2009 | Gaug et al. | ..................... | 715/234 |
| 7,584,424 B2 * | 9/2009 | Hanechak | ..................... | 715/244 |
| 7,698,631 B1 * | 4/2010 | Toebes | .......................... | 715/234 |
| 7,698,636 B2 * | 4/2010 | Mohamed | ...................... | 715/255 |
| 7,707,191 B2 * | 4/2010 | Arkhipov et al. | ............. | 707/684 |

(Continued)

OTHER PUBLICATIONS

N. Fiedler, "Undo/Redo Support," archived Aug. 30, 2006, downloaded from <"http://web.archive.org/web/20060830130954/http://xml.netbeans.org/specs/undo/index.html">, pp. 1-5.*

(Continued)

*Primary Examiner* — Cesar Paula
*Assistant Examiner* — James H Blackwell
(74) *Attorney, Agent, or Firm* — Osha • Liang LLP

(57) ABSTRACT

A method and a system for providing undo/redo capabilities in mixed model editors. More specifically, the method and system relate to undoing modifications made in a first edit context such that the result can correctly be displayed in a second edit context. Further, the modifications made may be tracked in the multiple contexts and organized such that the modifications are undone and redone correctly.

15 Claims, 6 Drawing Sheets

(56) References Cited

U.S. PATENT DOCUMENTS

| | | | | |
|---|---|---|---|---|
| 7,802,179 B2 * | 9/2010 | Bissonnette et al. | | 715/229 |
| 7,802,181 B2 * | 9/2010 | Fujimaki | | 715/234 |
| 7,818,718 B2 * | 10/2010 | Wedel et al. | | 717/110 |
| 7,823,060 B2 * | 10/2010 | Mohamed | | 715/234 |
| 7,877,731 B2 * | 1/2011 | Bekelman | | 717/123 |
| 7,979,804 B1 * | 7/2011 | Schang | | 715/763 |
| 8,078,963 B1 * | 12/2011 | Rosner et al. | | 715/255 |
| 8,127,278 B2 * | 2/2012 | Bohle | | 717/134 |
| 8,495,509 B1 * | 7/2013 | Schang | | 715/763 |
| 2002/0054128 A1 * | 5/2002 | Lau et al. | | 345/781 |
| 2002/0059345 A1 * | 5/2002 | Wang et al. | | 707/513 |
| 2003/0237046 A1 * | 12/2003 | Parker et al. | | 715/513 |
| 2004/0006764 A1 * | 1/2004 | Van De Vanter et al. | | 717/112 |
| 2004/0054701 A1 * | 3/2004 | Garst | | 708/131 |
| 2004/0123186 A1 * | 6/2004 | Kulp et al. | | 714/38 |
| 2004/0205663 A1 * | 10/2004 | Mohamed | | 715/530 |
| 2005/0183007 A1 * | 8/2005 | Gaug et al. | | 715/513 |
| 2007/0245232 A1 * | 10/2007 | Wake et al. | | 715/513 |
| 2007/0283246 A1 * | 12/2007 | Wake et al. | | 715/513 |
| 2008/0155397 A1 * | 6/2008 | Bissonnette et al. | | 715/256 |
| 2008/0177800 A1 * | 7/2008 | Arkhipov et al. | | 707/201 |

OTHER PUBLICATIONS

Dix, A. et al., "The Cube—Extending Systems for Undo," in Proc. of DSVIS'97, © 1997, pp. 473-495.*

Grundy, J. et al., "Keeping Free-edited Textual and Graphical Views of Information Consistent," Working Paper Series ISSN 1170-487X, © Mar. 1996, pp. 1-19.*

* cited by examiner

COMPOUND UNDO/REDO MANAGER FOR MIXED MODEL EDITS

BACKGROUND

An editor is a computer application that allows a user to alter the contents of a file. Typically, editors operate on plain text files, which only include ASCII characters, and provide functionality that facilitate in the altering of the contents of the plain text files. One such functionality is the undo/redo capability included in most editors. In its simplest form, an undo/redo tool allows the user to undo a single change and then, if requested, redo that single change.

More sophisticated editors track a large number of modifications in a history and allow the user to undo and redo any of the modifications in the history. Further, most editors group certain modifications together, such as continuous typing, so that the group can be undone in a single transaction.

Specialized editors also exist that are targeted at a specific type of plain text file such as source code, HyperText Markup Language (HTML), or Extensible Markup Language (XML). Due to the structure and/or restricted grammar of these plain text files, specialized editors can provide tools such as syntax highlighting and auto-completion. Further, markup languages like HTML and XML store additional information in the form of tags as well as text. In the case of HTML, the extra information contained in the tags can be used to render the text into a graphical presentation format. In the case of XML, the extra information contained in the tags can be used to render the text into a hierarchical presentation format. Some HTML and XML editors allow altering of the underlying text in a plain text file through both a standard text interface showing the text and an interface that shows the alternative presentation format (i.e., graphical presentation format or hierarchical presentation format).

Editors that allow modifications to be made in multiple presentation formats can be described as mixed model editors. Mixed model editors, like standard text editors, provide undo/redo capabilities; however, mixed model editors face an additional hurdle in that modifications must be tracked in multiple models. Further, modifications made in a first model (e.g., a text model) may not correspond to a valid modification in a second model (e.g., a graphical model). For example, modifying the text in an HTML file may result in malformed HTML that cannot be rendered in the graphical presentation format, resulting in a broken model.

In general, one of two approaches is used in mixed model editors to deal with broken models. The first approach is to delete any stored modifications whenever the editor switches from a first model to a second model. The second approach is to display a message stating that the model is broken until the user manually makes modifications resulting in valid text that can be parsed by the second model.

SUMMARY

In general, in one aspect, the invention relates to a method for managing mixed model edits. The method includes receiving a first plurality of modifications to text in a first edit context, wherein the text is displayed in the first edit context in a first presentation format, changing to a second edit context, wherein the text is displayed in the second edit context in a second presentation format and wherein the second presentation format is a current presentation format, and undoing the first plurality of modifications, wherein the text is displayed in the current presentation format.

In general, in one aspect, the invention relates to a mixed model editor that includes an editor interface and a state manager. The editor interface is configured to display text in a first edit context in a first presentation format, wherein the first presentation format is a current presentation format, receive a plurality of modifications to the text in the first edit context, change to a second edit context, wherein the text is displayed in a second presentation format, and wherein the second presentation format is the current presentation format, and receive an undo command. The state manager is configured to undo the first plurality of modifications, responsive to the undo command, wherein the text is displayed in the current presentation format.

In general, in one aspect, the invention relates to a computer readable medium having computer program code embodied therein for causing a computer system to manage mixed model edits, the computer program code including program instructions to receive a first plurality of modifications in a first edit context, wherein text is displayed in the first edit context in a first presentation format, change to a second edit context, wherein the text is displayed in the second edit context in a second presentation format and wherein the second presentation format is a current presentation format, and undo the first plurality of modifications, wherein the text is displayed in the current presentation format.

Other aspects of the invention will be apparent from the following description and the appended claims.

DETAILED DESCRIPTION

Figure 1:
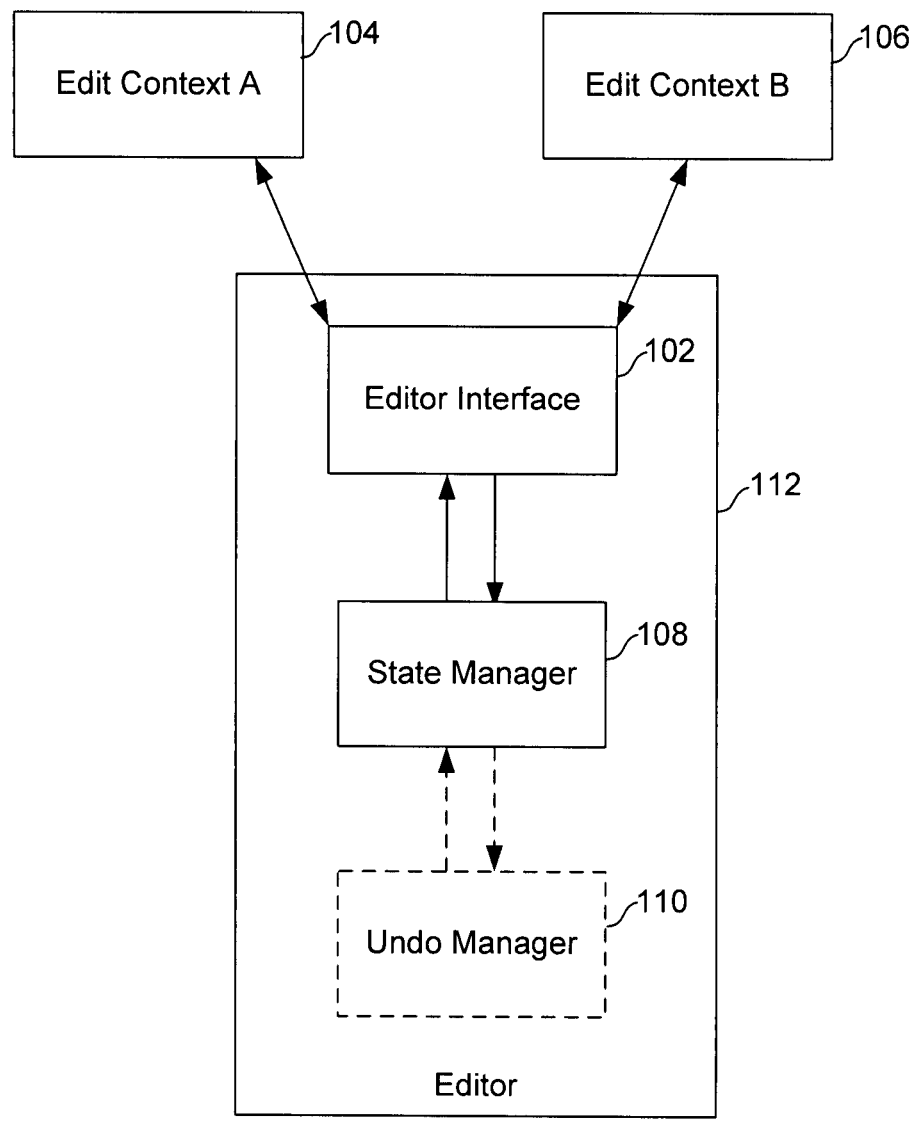
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However; it will be apparent to one of ordinary skill in the art that the invention may be practiced without these specific details. In other instances, well-known features have not been described in detail to avoid obscuring the invention.

In general, embodiments of the invention relate to providing a method and a system for providing undo/redo capabilities in mixed model editors. More specifically, embodiments of the invention relate to undoing modifications made in a first edit context such that the result can correctly be displayed in a second edit context. Further, embodiments of the invention provide a method and a system to track modifications made in multiple contexts and organize those modifications such that the modifications can be undone and redone correctly.

FIG. 1 shows a system in accordance with one or more embodiments of the invention. The system includes an editor (112) and two edit contexts (e.g., Edit Context A (104), Edit Context B (104)). The editor (112) includes an editor interface (102) and a state manager (108). In one or more embodiments of the invention, the state manager (108) interacts with the editor interface (102). The editor interface (102) further interacts with a first edit context (104) and a second edit context (106). In some embodiments of the invention, the editor (112) may include an undo manager (110) connected to the state manager (108). Each of the aforementioned components of FIG. 1 is described below.

In one or more embodiments of the invention, the editor (112) may be a computer application for editing plain text files. For example, the editor (112) may be an XML editor, HTML editor, Web Service Definition Language (WSDL) editor, source code editor, etc. The editor (112) may also be a plug-in for editing plain text files in a larger application. In one embodiment of the invention, the editor (112) may include an editing interface (102) and a state manager (108) for editing of plain text files.

The editing interface (102) may provide an interface to a user for modifying the contents of plain text files. Further, the editor interface (102) may be configured to track modifications made to the contents of the plain text files. In one or more embodiments of the invention, the editing interface (102) may interact with the state manager (108) to provide undo/redo capabilities to the user. In some embodiments of the invention, the editing interface (102) may allow the user to modify the content of plain text files in different edit contexts (e.g., Edit Context A (104), Edit Context B (104)). Specifically, the editing interface (102) may present the content of a plain text file in a different presentation format in each of the edit contexts (e.g., Edit Context A (104), Edit Context B (104)). For example, depending on the edit context selected by the user, the editing interface (102) may present the content of a plain text file in a graphical presentation format in Edit Context A (104) and a textual presentation format in Edit Context B (106).

Those skilled in the art will appreciate that there could be any number of edit contexts depending on the number of different presentation formats that the editor (112) supports. For example, an HTML editor could have three edit contexts to support a textual presentation format, a hierarchical presentation format, and a graphical presentation format.

Further, those skilled in the art will appreciate that a modification may be more than a single character or action. For example, a modification could be a plurality of characters grouped together by continuous typing. Alternatively, a modification could be a single operation performed on multiple sections of the text simultaneously (e.g., find and replace all, indent a number of lines, etc.)

Referring again to FIG. 1, the state manager (108) may use a variety of methods to provide undo/redo capabilities in the editor (112). For example, when a modification is made in edit context A (104), the editor interface (102) may send the modification to the state manager (108) to store the modifications associated with edit context A (104). Further, the state manager (108) may store all modifications made in edit context A (104) as a batch when the editor interface (102) is changed to edit context B (106). When undone, the batch of modifications made in edit context A (104) may be undone in a single transaction allowing the text to be properly displayed in the editor interface (102). Alternatively, the state manager may convert all modifications made in edit context A (104) to subsets of modifications such that each subset correlates to a valid modification in the edit context B (106). For example, a subset of text modifications may correspond to a single hierarchical modification such that when the subset of text modifications is undone in a single transaction, the text may be properly displayed in the hierarchical presentation format. In contrast, if only a single text modification of the subset of text modifications is undone, the text cannot be properly displayed in the hierarchical presentation format.

In one or more embodiments of the invention, the state manager (108) may be further configured to store any undone modifications such that the state manager (108) may redo the undone modifications. Further, the state manager (108) may be further configured to store any undone batches of modifications such that the state manager (108) may redo the undone batches of modifications.

Those skilled in the art will appreciate that the state manager (108) may store the modifications by a variety of methods (e.g., in memory, in an XML file, in a database, etc.). For example, the state manager (108) may send the modifications to an undo manager (110) to be stored in memory, In one or more embodiments of the invention, the undo manager (110) may be provided by an application framework (e.g., NetBeans, etc.). Further, those skilled in the art will appreciate that the state manager may store multiple batches of modifications, where each batch of modifications is associated with an edit context. Further, those skilled in the art will appreciate that modifications may be associated with a batch by a variety of methods (e.g., designating the batch for each modification, storing the modifications in a data structure associated with the batch, storing placeholder modifications to separate the batches, etc.). For example, modifications may be associated with a batch by storing placeholder modifications to separate the batches. When a placeholder modification is undone, the state manager (108) may then continue to undo modifications as a single transaction until the state manager (108) identifies that the next modification to undo is another placeholder modification. Those skilled in the art will appreciate that the placeholder modification may include a variety of information (e.g., edit context of the modifications, number of modifications in the batch, etc.).

Those skilled in the art will appreciate that the state manager (108) could be a plurality of state managers, where each state manager is dedicated to tracking modifications for a specific edit context. Further, those skilled in the art will appreciate that the modifications may be undone in a number of ways. For example, the state manager may undo the modifications directly, the editor may undo the modifications upon receiving information from the state manager, etc.

Figure 2:
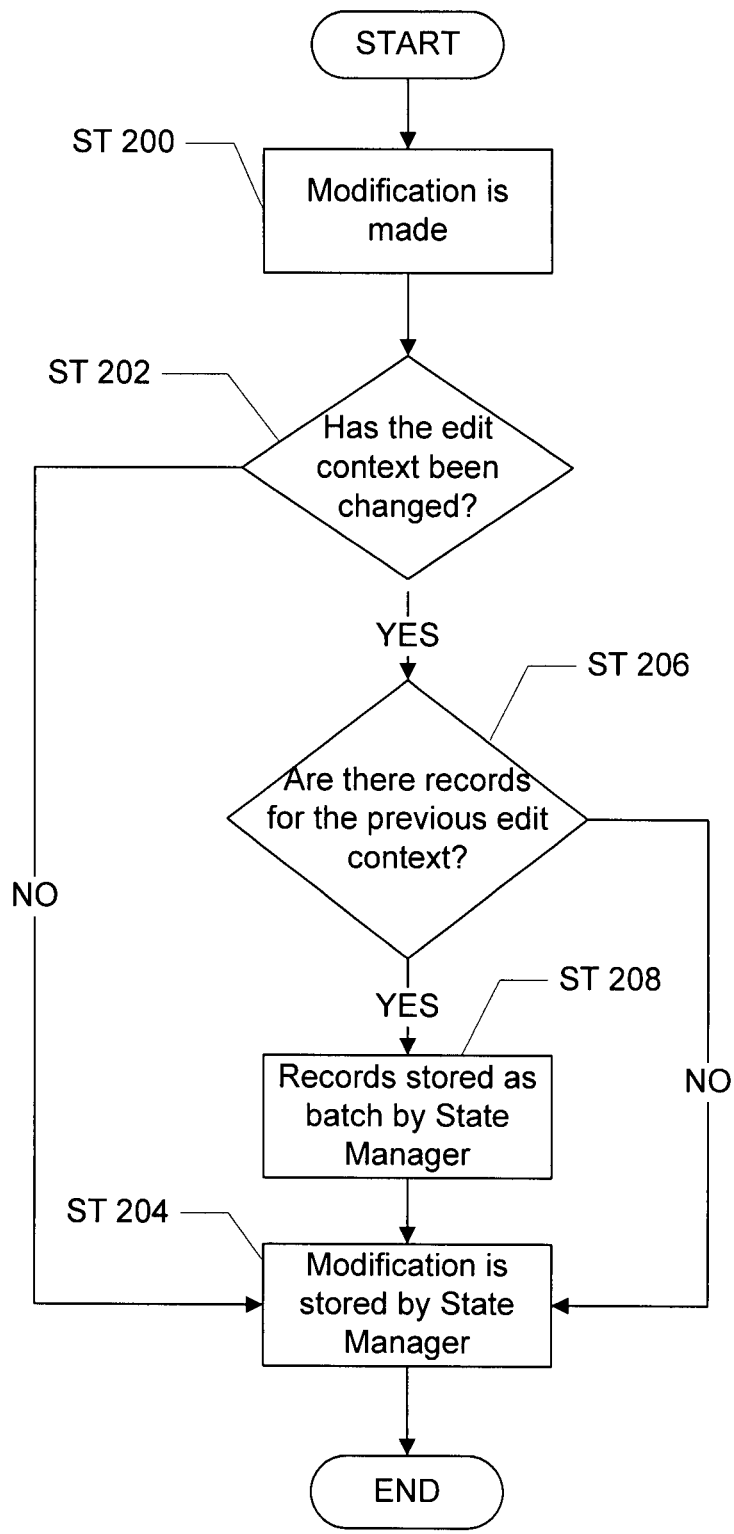
FIGS. 2-5 show flowcharts in accordance with one or more embodiments of the invention.

FIG. 2 shows a flow chart for storing mixed model modifications in a state manager in accordance with one or more embodiments of the invention. In one or more embodiments of the invention, one or more of the steps described below may be omitted, repeated, and/or performed in a different order. Accordingly, the specific arrangement of steps shown in FIG. 2 should not be construed as limiting the scope of the invention.

Initially, a modification is made (ST 200) in the editor. In one embodiment of the invention, the state manager may then check to see if the edit context has been changed since the last modification (ST 202). Alternatively, the state manager may be notified of any context changes directly from the editor. If the edit context has not changed since the last modification, the state manager may then store the modification (ST 204) and wait for the next modification.

If the edit context has changed since the last modification (ST 202), the state manager may then determine whether there are any records of modifications made in the previous edit context (ST 206). If the state manager does not contain any records, then the state manager may store the modification (ST 204) and wait for the next modification. However, if there are records of modifications made in a previous edit context, the state manager stores the modifications from the previous edit context as a batch (ST 208). Alternatively, the state manager may store the records in subsets, where each subset corresponds to a single modification in the current edit context. Those skilled in the art will appreciate that these records may be stored in a separate state manager, in a separate storing system, in the current state manager in a location other than where the current modifications are stored, etc. After storing the modification from the previous edit context, the state manager stores the new modification. (ST204).

Figure 3:
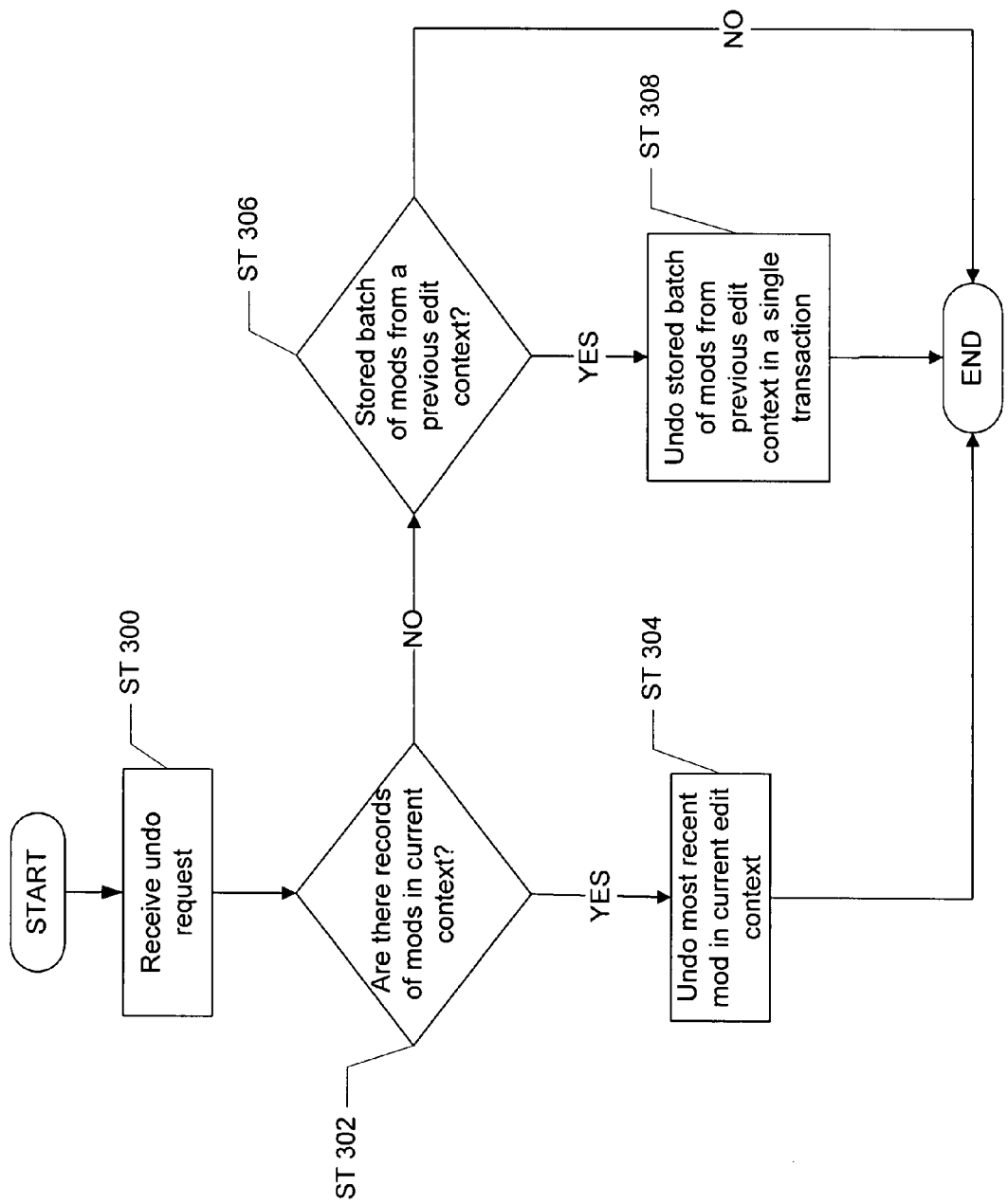

FIG. 3 shows a flow chart for undoing mixed model modifications in accordance with one or more embodiments of the invention. In one or more embodiments of the invention, one or more of the steps described below may be omitted, repeated, and/or performed in a different order. Accordingly, the specific arrangement of steps shown in FIG. 3 should not be construed as limiting the scope of the invention.

Initially, an editor receives a request to undo the last modification (ST 300). The state manager determines whether there are any records of modifications made in the current edit context (ST 302). If there are any modifications made in the current edit context, the state manager undoes the most recent modification made in the current edit context (ST 304).

If no modifications were made in the current edit context (ST 302), the state manager then determines whether there is a stored batch of modifications from a previous edit context (ST 306). If there is no stored batch of modifications from a previous edit context, there is nothing to be done, and the process ends. However, if there is a stored batch of modifications from a previous edit context, the state manager undoes the stored batch of modifications in a single transaction (ST 308). In other words, each modification in the first stored batch of modifications is undone before displaying the result, such that the result is properly displayed in the presentation format of the current edit context. For example, if the first stored batch of modifications contained five text modifications, the five text modifications are undone in a single transaction to ensure that the text can be properly displayed in a graphical presentation format. Alternatively, the state manager may undo the modifications in the first stored batch of modifications individually if the first stored batch of modifications contains modifications made in the current edit context. Those skilled in the art will appreciate that multiple stored batches from multiple previous edit contexts may be stored by the state manager. When multiple stored batches are present, the state manager undoes the most recent stored batch in response to the undo request.

Those skilled in the art will appreciate that when a modification is undone, the result of the undoing may be stored as an undone modification. Further, those skilled in the art will appreciate that when a batch of modifications is undone in a single transaction, the result of undoing the batch of modifications may be stored as an undone batch of modifications.

Those skilled in the art will appreciate that the underlying text may always be properly displayed in the current presentation format of the current edit context during the steps describe in FIG. 3. Further, in some embodiments of the invention, if modifications result in text that may not be properly displayed in the presentation format of the current edit context, the editor interface may prevent the user from changing to a different edit context. Alternatively, the editor may allow the user to change to a different edit context and then display a message that the underlying text may not be correctly displayed in the presentation format of the different edit context.

Figure 4:
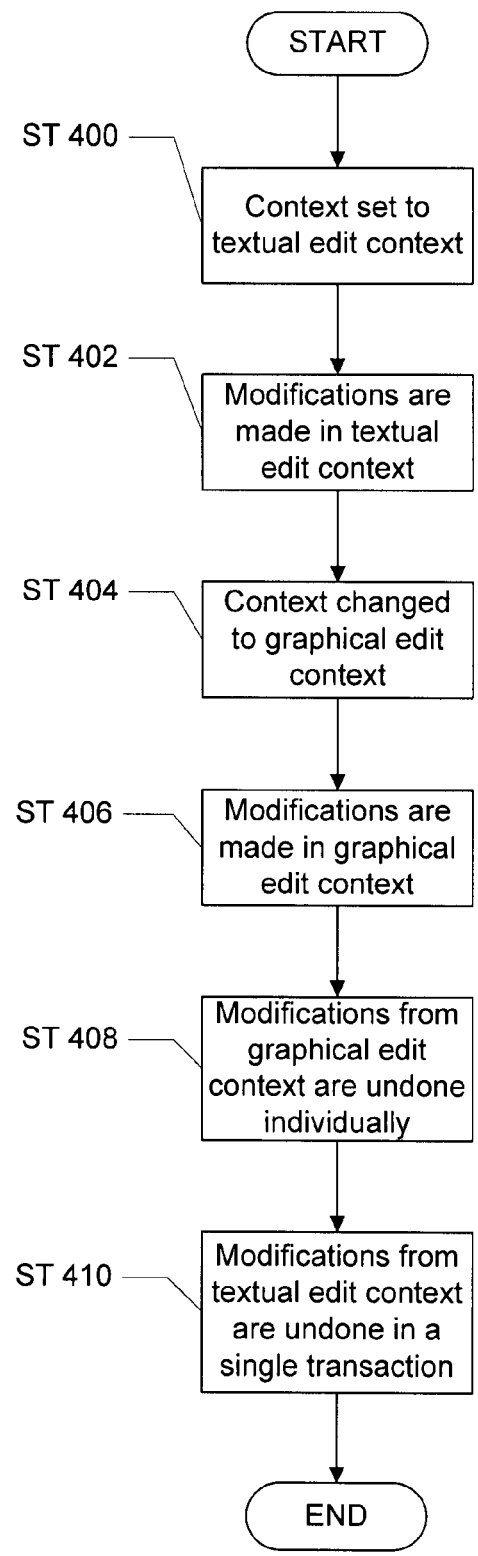

FIG. 4 shows a flow chart of an example of storing and undoing mixed model modifications in accordance with one or more embodiments of the invention. In one or more embodiments of the invention, one or more of the steps described below may be omitted, repeated, and/or performed in a different order. Accordingly, the specific arrangement of steps shown in FIG. 4 should not be construed as limiting the scope of the invention.

Initially, the current edit context may be set to a textual edit context (ST 400), where the textual edit context displays the text of an XML file in the editor interface in a textual presentation format. A user then makes modifications to text of the XML file using the textual representation in the textual edit context (ST 402). Next, the user switches from the textual edit context to a graphical edit context (ST 404), where the graphical edit context displays the text of the XML file in the editor interface in a graphical presentation format. The user may then make more modifications in the graphical edit context (ST 406), where the modifications are made to the graphical representation of the XML file such that the underlying text is altered to reflect the changes made to the graphical representation. When the user makes the initial modification in the graphical edit context, the modifications made in the textual edit context are stored as a batch.

The user may then choose to undo the modifications. The modifications made in the graphical edit context may be undone individually because the current edit context is the graphical edit context (ST 408). Specifically, since the modifications consist of a number of modifications made to the graphical representation of the XML file, each graphical modification may be undone individually. If the user continues to request that modifications be undone after each and every modification in the graphical edit context has been undone, the batch of modifications is undone in a single transaction (ST 410). That is, all the textual modifications in the batch of modifications may be undone before displaying the resulting XML, such that the resulting XML properly displays in the graphical presentation format of the graphical edit context.

Figure 5:
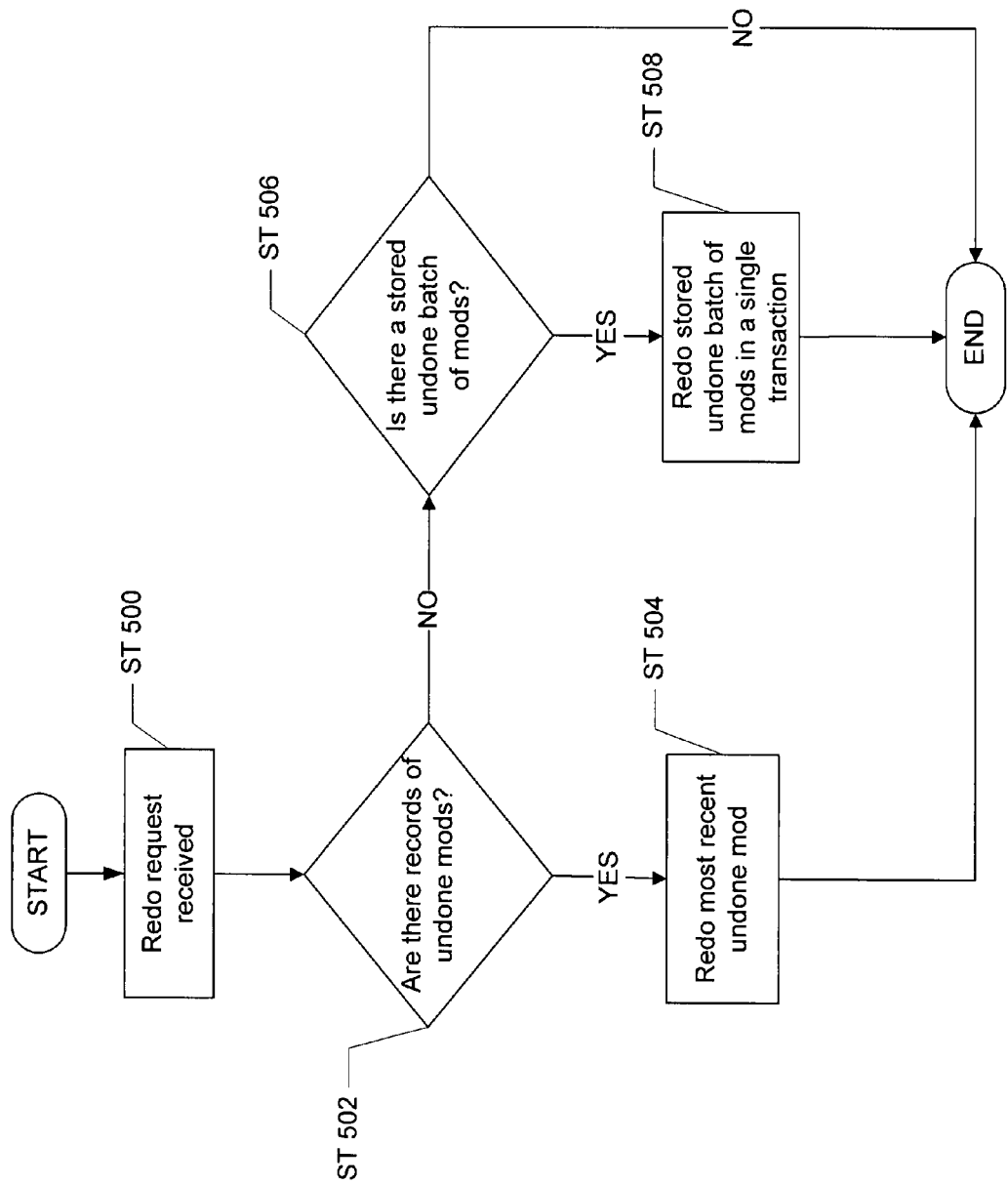

FIG. 5 shows a flow chart for redoing mixed model modifications in accordance with one or more embodiments of the invention. In one or more embodiments of the invention, one or more of the steps described below may be omitted, repeated, and/or performed in a different order. Accordingly, the specific arrangement of steps shown in FIG. 5 should not be construed as limiting the scope of the invention.

Initially, the editor receives a request to redo an undone modification (ST 500). In one embodiment of the invention, the state manager may then check to see if there are any records of undone modifications made in the current edit context (ST 502). If there is at least one undone modification made in the current edit context, the state manager may redo the most recently undone modification in the current edit context (ST 504).

Alternatively, if the state manager does not contain any undone modifications in the current edit context at ST 502, the state manager may then check to see if there is a stored undone batch of modifications (ST 506). If the there is no stored undone batch of modifications, there is nothing to be done, and the process ends. However, if there is a stored undone batch of modifications, the state manager redoes the stored undone batch of modifications in a single transaction (ST 508). In other words, each modification in the stored undone batch of modifications is redone before displaying the result, such that the result is properly displayed in the presentation format of the current edit context. Alternatively, the state manager may redo the modifications in the stored undone batch of modifications individually if the stored undone batch of modifications contains modifications made in the current edit context. Those skilled in the art will appreciate that multiple stored undone batches may be stored by the state manager. When multiple stored undone batches are present, the state manager redoes the most recent undone stored batch in response to the redo request.

In one or more embodiments of the invention, undoing/redoing modifications in a single transaction allows modifications to be tracked across multiple presentation formats. Specifically, undoing/redoing modifications in a single transaction may allow the underlying text to be properly displayed as the user changes between multiple presentation formats. In one or more embodiments of the invention, processing modifications in a single transaction provides the user with expected results when undoing/redoing modifications made in multiple presentation formats.

Figure 6:
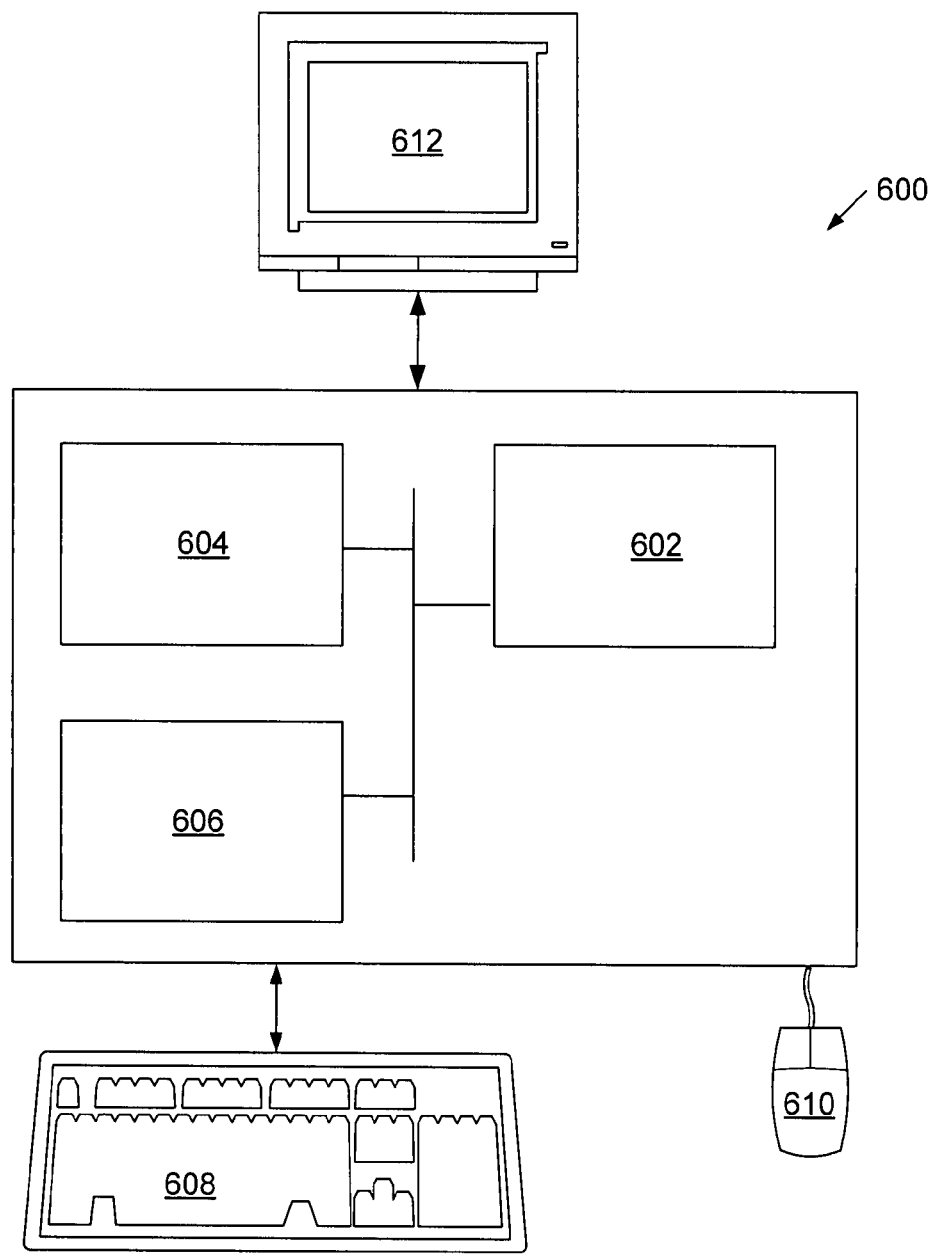
FIG. 6 shows a computer system in accordance with one or more embodiments of the invention.

Embodiments of the invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (600) may be located at a remote location and connected to the other elements over a network.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., editor interface, state manager, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing mixed model edits, comprising:
receiving a first text modification and a second text modification to a plurality of text items in a textual edit context, wherein the plurality of text items is displayed in the textual edit context in a textual presentation format, and wherein the first text modification and the second text modification are different;
changing to a graphical edit context, wherein the plurality of text items is rendered in the graphical edit context in a graphical presentation format;
after and in response to changing to the graphical edit context, grouping the first text modification and the second text modification as a first batch of text modifications;
receiving, in the graphical edit context, a graphical modification to the plurality of text items; and
in response to receiving, while in the graphical edit context, a first undo command and a second undo command:
(a) determining, by a state manager, that the first batch of modifications from a previous edit context is stored in memory;
(b) undoing, in response to the first undo command, the graphical modification;
(c) undoing, in response to the second undo command and based on the determination, the first batch of modifications in a single transaction to obtain first resulting text, wherein the first resulting text comprises the plurality of text items; and
(d) displaying the first resulting text in the graphical edit context in the graphical presentation format, wherein (b) is performed before (c).

2. The method of claim 1, wherein the plurality of text items is written in Extensible Markup Language.

3. The method of claim 1, wherein the first text modification and the second text modification are able to be undone individually before changing to the graphical edit context.

4. The method of claim 1, wherein the undo command is separate from a delete command.

5. The method of claim 1, wherein the first text modification and the second text modification are able to be displayed in the graphical presentation format.

6. A mixed model editor, comprising:
memory comprising software instructions; and
a processor operatively connected to the memory and configured to execute:
an editor interface, wherein the editor interface is configured to:
display a plurality of text items in a textual edit context in a textual presentation format;
receive a first text modification and a second text modification to the plurality of text items in the textual edit context, wherein the first text modification and the second text modification are different;
change to a graphical edit context, wherein the plurality of text items is rendered in the graphical edit context in a graphical presentation format;
after and in response to changing to the graphical edit context, grouping the first text modification and the second text modification as a first batch of text modifications;
receive, in the graphical edit context, a graphical modification to the plurality of text items; and
receive, while in the graphical edit context, a first undo command and a second undo command; and
a state manager, wherein the state manager is configured to:
in response to receiving the first undo command and the second undo command:
(a) determine that the first batch of modifications from a previous edit context is stored in memory;
(b) undo, in response to the first undo command, the graphical modification; and
(c) undo, in response to the second undo command and based on the determination, the first batch of modifications in a single transaction to obtain first resulting text, wherein the first resulting text comprises the plurality of text items, and wherein (b) is performed before (c), wherein the editor interface is further configured to:
display the first resulting text in the graphical edit context in the graphical presentation format.

7. The mixed model editor of claim 6, wherein the plurality of text items is written in Extensible Markup Language.

8. The mixed model editor of claim 6, wherein the first text modification and the second text modification are able to be undone individually before changing to the graphical edit context.

9. The mixed model editor of claim 6, wherein the undo command is separate from a delete command.

10. The mixed model editor of claim 6, wherein the first text modification and the second text modification are able to be displayed in the graphical presentation format.

11. A non-transitory computer readable medium comprising computer program code embodied therein for causing a computer system to manage mixed model edits, the computer program code comprising program instructions to:
receive a first text modification and a second text modification to a plurality of text items in a textual edit context, wherein the text is displayed in the textual edit context in a textual presentation format, and wherein the first text modification and the second text modification are different;
change to a graphical edit context, wherein the plurality of text items is rendered in the graphical edit context in a graphical presentation format;
after and in response to changing to the graphical edit context, group the first text modification and the second text modification as a first batch of text modifications;
receive, in the graphical edit context, a graphical modification to the plurality of text items;
in response to receiving, while in the graphical edit context, a first undo command and a second undo command:
 (a) determine, by a state manager, that the first batch of modifications from a previous edit context is stored in memory;
 (b) undo, in response to the first undo command, the graphical modification;
 (c) undo, in response to the second undo command and based on the determination, the first batch of modifications in a single transaction to obtain first resulting text, wherein the first resulting text comprises the plurality of text items; and
 (d) display the first resulting text in the graphical edit context in the graphical presentation format, wherein (b) is performed before (c).

12. The non-transitory computer readable medium of claim 11, wherein the plurality of text items is written in Extensible Markup Language.

13. The non-transitory computer readable medium of claim 11, wherein the first text modification and the second text modification are able to be undone individually before changing to the graphical edit context.

14. The non-transitory computer readable medium of claim 11, wherein the undo command is separate from a delete command.

15. The non-transitory computer readable medium of claim 11, wherein the first text modification and the second text modification are able to be displayed in the graphical presentation format.

* * * * *